US006931420B1

(12) United States Patent
Silvester et al.

(10) Patent No.: US 6,931,420 B1
(45) Date of Patent: Aug. 16, 2005

(54) METHOD FOR THE SEPARATE AUTHENTICATION OF A TEMPLATE AND USER DATA

(75) Inventors: Joseph Silvester, Dollard-des-Ormeaux (CA); Ed Milczarek, Pierrefonds (CA); Tommy Petrogiannis, Montréal (CA)

(73) Assignee: Silanis Technology Inc., Québec (CA)

( * ) Notice: Subject to any disclaimer, the term of this patent is extended or adjusted under 35 U.S.C. 154(b) by 0 days.

(21) Appl. No.: 09/405,242

(22) Filed: Sep. 24, 1999

(51) Int. Cl.[7] .............................................. G06F 17/30
(52) U.S. Cl. ........................ 707/202; 707/102; 713/200
(58) Field of Search ................................ 713/200, 176, 713/186, 168, 156; 707/8, 1, 4, 202; 380/200; 709/217, 203, 239

(56) References Cited

U.S. PATENT DOCUMENTS

| 5,892,824 | A | * | 4/1999 | Beatson et al. ............. 713/186 |
| 5,898,779 | A | * | 4/1999 | Squilla et al. .............. 713/176 |
| 6,021,426 | A | * | 2/2000 | Douglis et al. ............. 709/200 |
| 6,035,398 | A | * | 3/2000 | Bjorn ........................ 713/186 |
| 6,071,190 | A | * | 6/2000 | Weiss et al. ................ 463/25 |
| 6,105,012 | A | * | 8/2000 | Chang et al. ............... 705/64 |
| 6,185,316 | B1 | * | 2/2001 | Buffam ....................... 713/186 |

FOREIGN PATENT DOCUMENTS

| EP | 0 565 314 A2 | 10/1993 |
| WO | WO 98/03927 | 1/1998 |

OTHER PUBLICATIONS

The Impact of Technology on the Notary Process, http://law.uark.edu/~gahlers/notary.htm, XP002125327.

* cited by examiner

Primary Examiner—Charles L. Rones
Assistant Examiner—Hassan Mahmoudi
(74) Attorney, Agent, or Firm—Merchant & Gould P.C.

(57) ABSTRACT

A method for the separate authentication of a template and of data inserted therein. A template is provided with a template ID and a template Data Authentication Code (DAC(t)). User data is inserted in the template, and then extracted to be handled separately. A DAC(d) is generated on the user data by itself, and stored in an Approval Data packet with the template ID, DAC(t) and the user data. The complete document with the template and the user data can later be reconstructed. The method may be useful for many industries that rely on templates for collecting data.

25 Claims, 7 Drawing Sheets

METHOD FOR THE SEPARATE AUTHENTICATION OF A TEMPLATE AND USER DATA

FIELD OF THE INVENTION

The present invention relates to the secure handling of data and more particularly concerns a method for separately authenticating a template and user data inserted in the template.

BACKGROUND OF THE INVENTION

There are many computer systems that have been designed to create, store, approve, revise or verify data electronically. Many of the documents that have been created through these systems have relied on a pre-existing template as a means of assembling data. This facilitates the means of data entry and allows the user to store the data and the template on one document. The use of the template also contributes to a less time-consuming process of entering information on an electronic document, a process that may contribute to fewer costs than those associated with paper-based data collection.

While there exist a great number of systems that may facilitate the creation, serial approval, storage and authentication of documents or of templates, there is no known system to date that can enable users to separate user data from template information. Current systems allow users to create templates and enter data in them. The data therefore becomes bound to the template in a single document. However, such systems do not have the capacity to enable users to securely approve, store and authenticate each portion separately, to approve multiple templates or, alternatively, opt to recreate the complete document.

Existing systems vary in the scope of the functions they can perform. Some are particularly limited, such as U.S. Pat. No. 4,933,969 to Marshall et al., which primarily addresses authentication and storage. This mechanism stores information and protects against unauthorized modifications. While this type of data authentication system contributes greatly to ensuring the security and integrity of data, it lacks the capacity for the generation, approval and secure storage of both template information and user data.

Other systems offer certain types of electronic functions that are related to the generation and authentication of electronic signatures. For example, U.S. Pat. No. 5,195,133 to Kapp et al. describes a system designed to generate a completed payment document, which can be signed by a customer, and then capture that customer's signature in digital form. The principal feature of this mechanism is that it seeks to ensure that a signature approving a particular document was, in fact, captured at the time of the completion of the transaction to which it relates and was not obtained on some other occasion and merely reproduced for the particular transaction in question. The Kapp et al. patent creates a digital record of the transaction and captures a digital representation of the signature at the time the transaction is completed. This system then uses this digital record to encrypt the digital representation of the signature. However, it does not offer any possibility of generating or approving a template document separately from the user data or the electronic approval.

Other technology provides for the creation of an electronic signature for a particular signer only, and cannot be used for any document other than the one for which the signature was given (U.S. Pat. No. 5,689,567). U.S. Pat. No. 5,606,609 to Houser and Adler is a system designed to verify the integrity or signer of electronic documents. This is accomplished by embedding and encrypting security information in the electronic document at a location selected by the signer. When the electronic document is subsequently displayed, the technology decrypts the security information and verifies the identity of the signer. In another mechanism, another method operates to authenticate and verify users on a network (U.S. Pat. No. 5,706,427). The possible applications of any of the aforementioned systems, albeit useful for certain purposes, are nonetheless limited as they do not allow for the creation, approval or authentication of template information distinct from the user data.

While each of the aforementioned systems can be useful for electronic business processes, they all have certain deficiencies. These mechanisms lack the capacity to enable the user to generate, approve, store and authenticate template information separately from user data, with the possibility of subsequently merging the two later in a complete document. Current technology operates such that any user data entered on the template becomes bound to the template in one document. The present invention allows users to access either the template data, multiple templates and/or the user data as independent files. Moreover, the technology ensures that no unauthorized modifications can be made to either file or to the complete document. This therefore accords the user greater flexibility in accessing each file without compromising the security or authenticity of the data.

The Remote Template Approval ("RTA") can serve as a vital tool facilitating electronic business processes. Many industries, such as insurance for example, which rely on templates and standard forms as a means of gathering information or selling and marketing services can greatly benefit from this technology. The RTA would enable those marketing these services to securely store and access user data separately from the templates, while individual template information could be generated, accessed or modified for each subsequent user or purchaser. This would represent an efficient way of gathering, storing and authenticating client and template information. In addition, it would offer an easy and secure medium through which users or consumers could submit information and purchase services on-line.

Clearly then, as electronic business transactions become even more prevalent, the need to generate and store template information and user data as separate entities will become more pronounced as well. As this occurs, the need for the Remote Template Approval mechanism will expand with it.

SUMMARY OF THE INVENTION

The present invention provides a system and method designed to facilitate remote template approval. This system will enable users to separate user data from template information and authenticate and verify each portion separately. Thus, by virtue of this method, users will be able to approve template information separately from the data added to the template. Preferably, this invention will also enable users to securely recreate the complete document composed of both data and template and verify its authenticity. Such a process would represent a marked improvement over existing systems which enable users to add data to existing templates in such a fashion as to bind the data to the template in one document. The present invention allows the user to securely access the template and the data as distinct records, or to, optionally, access the complete document.

Accordingly, the present invention provides a method for the separate authentication of a template and of user data inserted therein, comprising the steps of:

a) providing the template, said template having a corresponding template ID and template Document Authentication Code, hereinafter referred to as DAC(t), linked thereto;
b) inserting the user data in the template;
c) extracting the user data from the template;
d) generating a user data Document Authentication Code, hereinafter referred to as DAC(d), based on the user data; and
e) storing the template ID, DAC(t), the user data and DAC(d) in an Approval Data Packet, hereinafter referred to as ADP.

There is also provided a method for the separate authentication of a template having entry fields and user data inserted into said fields, comprising the steps of:

a) selecting a template ID and a corresponding template Document Authentication Code, hereinafter referred to as DAC(t), linked to the template;
b) entering the user data;
c) linking the user data to the fields of the template;
d) generating a user data Document Authentication Code, hereinafter referred to as DAC(d), based on the user data; and
e) storing the template ID, DAC(t), the user data and DAC(d) in an Approval Data Packet, hereinafter referred to as ADP.

The present invention further provides a method for the separate authentication of a template and of user data inserted therein, comprising the steps of:

a) providing the template, said template having a corresponding template ID and template Document Authentication Code, hereinafter referred to as DAC(t), linked thereto;
b) inserting the user data in the template;
c) generating a complete document Document Authentication Code, hereinafter referred to as DAC(c), based on the template with the user data therein;
d) extracting the user data from the template;
e) generating a user data Document Authentication Code, hereinafter referred to as DAC(d), based on the user data; and
f) storing the template ID, DAC(t), the user data, DAC(c) and DAC(d) in an Approval Data Packet, hereinafter referred to as ADP.

Also provided is a method for the separate authentication of a template and of user data inserted therein by multiple users, comprising the steps of:

a) authenticating a template and user data from a first user according to the last method described above; and
b) for each subsequent user of the multiple users, performing the substeps of:
  i) retrieving the template and DAC(c);
  ii) inserting user data from previous users in the template;
  iii) generating for the template with the user data from previous users therein a new complete document Document Authentication Code, hereinafter referred to as DAC(nc);
  iv) comparing DAC(nc) with DAC(c), and proceeding only if DAC(nc) is equal to DAC(c);
  v) inserting data from the current user in the template;
  vi) generating a DAC(c), based on the template with the user data from the previous users and current user therein;
  vii) extracting the user data from the previous users and current user from the template;
  viii) generating a DAC(d), based on the user data extracted in step vii); and
  ix) storing the user data, DAC(c) and DAC(d) in ADP.

The present invention can have numerous applications. For example, it could enable users to create and approve one document on one system (e-mail for example), with the target template indicated in the ADP, and send it to another system, which may be the same system or a completely different one. The message can then be entered into the actual template document with all the proper formatting and no need to convert the document.

This invention would be useful for many industries that rely on templates as a means of collecting data. The same template could be generated for each new user and the data collected could be stored separately or could also be combined with the template to create a completed document. This method would allow users to re-generate the template for each subsequent user.

The present invention and its advantages will be better understood upon reading the following non-restrictive description of embodiments thereof with reference to the accompanying drawings.

DESCRIPTION OF PREFERRED EMBODIMENTS OF THE INVENTION

Figure 1:
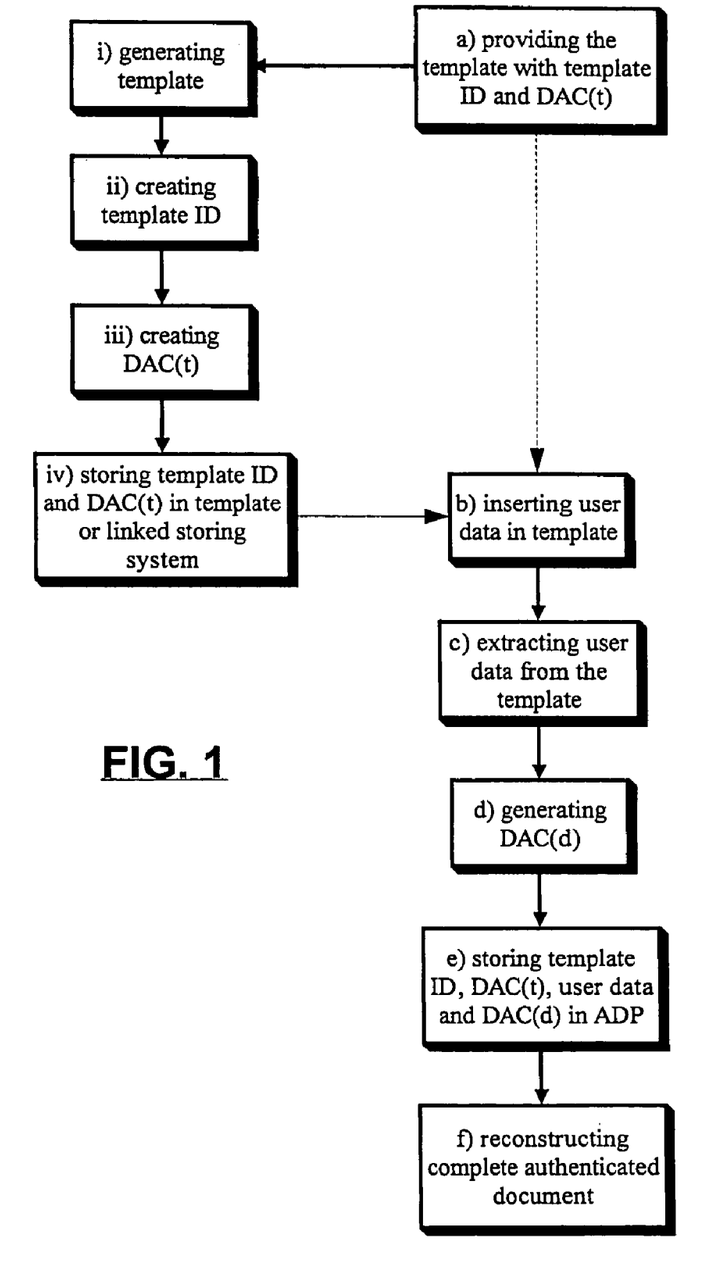
FIG. 1 is a flow chart representing the main steps of a method for the separate authentication of a template and of user data inserted therein in accordance with a preferred embodiment of the present invention.
Figure 2:
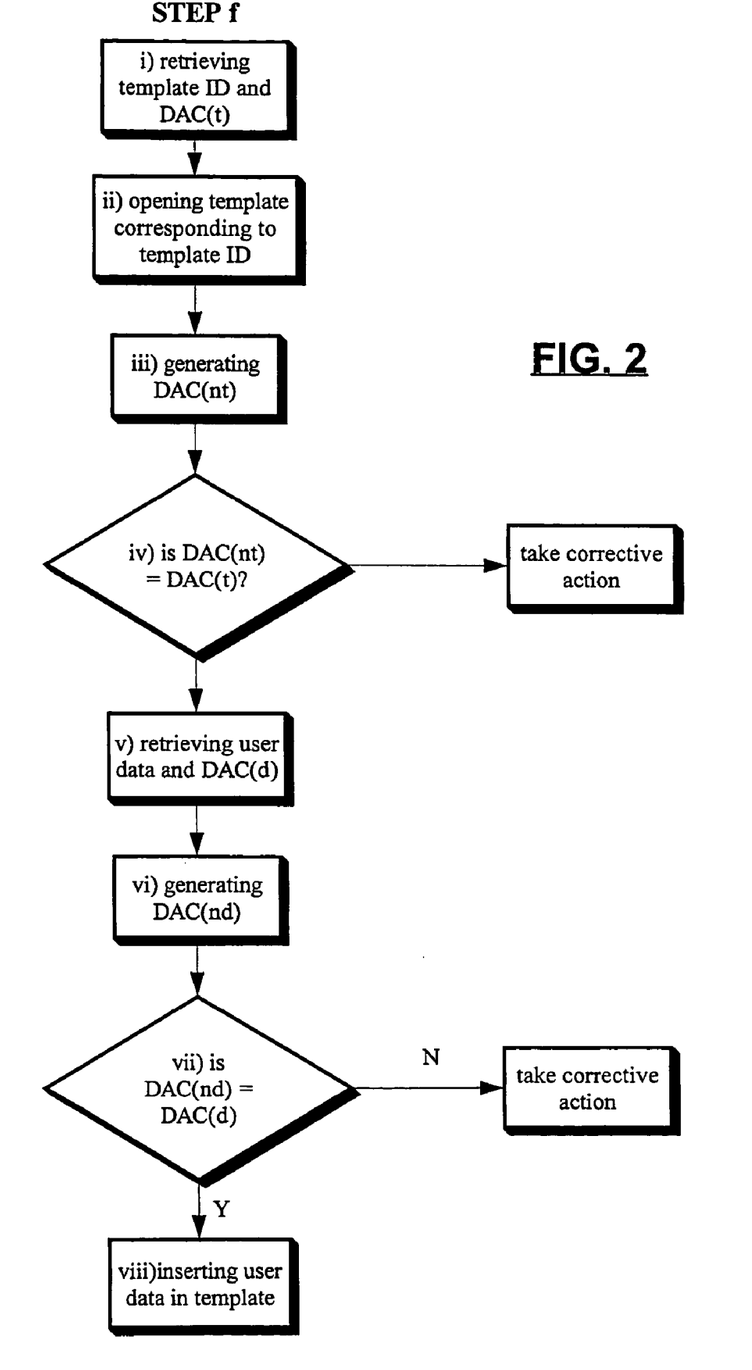
FIG. 2 is a flow chart detailing step f of the method of FIG. 1.

Referring to FIGS. 1 and 2, the steps of a method for the separate authentication of a template and user data inserted in the template are shown. This method allows the secure handling of the template and user data independently, without having to store the user data inside the template.

The first step a) of the method of FIG. 1 consists of providing the template itself. A template ID, identifying the particular template chosen and a template Document Authentication code, DAC(t), are both linked to the template. DAC(t) is a code characterizing precisely the template's content, and is preferably generated through a one-way hash function. If the template is not pre-existing, step a) may include the substep of generating the template, creating the template ID and DAC(t) and storing the last two in an appropriate location, which can for example be inside the template itself or in a linked storage system.

The second step b) consists of inserting the user data in the template. The term "user data" is understood as encompassing any relevant information that may be entered in a template, including a user signature and the date of signing. The method may therefore be used in the context of the remote approval of a document. The template preferably has specific fields where the user data may be received.

The user data is then extracted from the template in accordance with step c), and in the next step d) a user data Authentication Code (DAC(c)) is generated, based on the user data itself independently of the template.

Step e) consists of storing the template ID, DAC(t), the user data and DAC(c) in an Approval Data Packet (ADP) which may be encrypted for security. The user data may alternatively be stored elsewhere and a link to its location may be provided in the ADP.

Referring to FIGS. 1 and 2, there is shown an optional step f) of reconstructing a complete document including both the template and the user data. In accordance with this additional step, the template ID and DAC(t) are first retrieved from the ADP, and the template corresponding to the template ID is accessed and opened. A new DAC (DAC(nt)) is generated on the opened template, and compared to DAC(t). Corrective action is to be taken if they don't match. If they do match, the user data and DAC(d) are also retrieved. A DAC(nd) is generated on the user data and compared to DAC(d). If they also match, the user data may then be inserted in the template.

Figure 3:
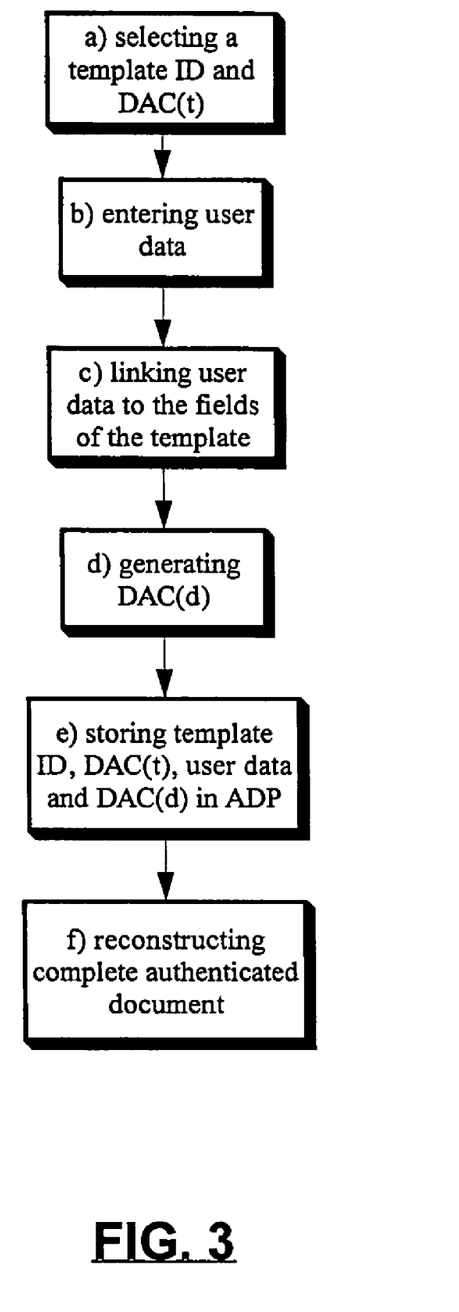
FIG. 3 is a flow chart representing the main steps of a method for the separate authentication of a template and of user data inserted therein in accordance with an alternative embodiment of the invention.

In an alternate embodiment of the invention, illustrated in FIG. 3, the method described above may be performed without actually accessing the template. In this embodiment, a template ID and the corresponding DAC(t) are selected, and the user data is entered, preferably in answer to prompts for particular information. The user data entered is then linked to corresponding fields in the template, so that a complete document including both the template and the user data may later be reconstructed.

Figure 4:
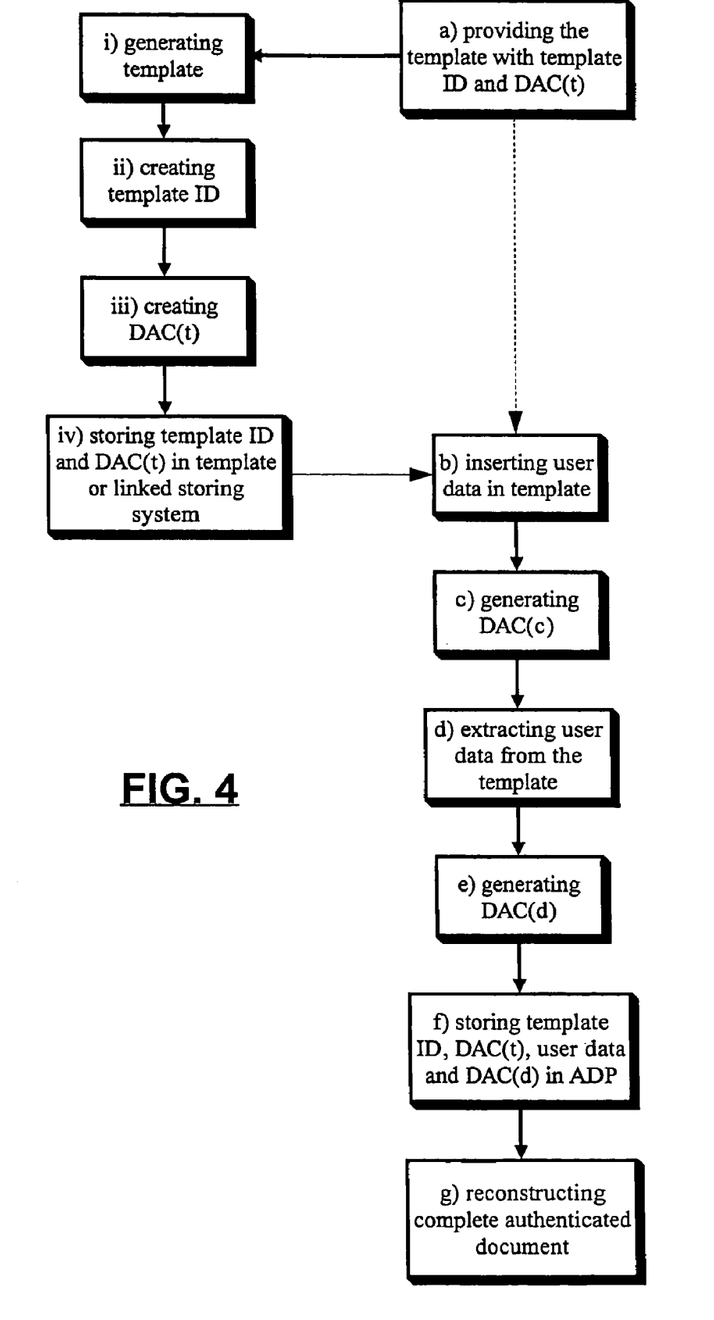
FIG. 4 is a flow chart representing the main steps of a method for the separate authentication of a template and of user data inserted therein in accordance with another embodiment of the invention.
Figure 5:
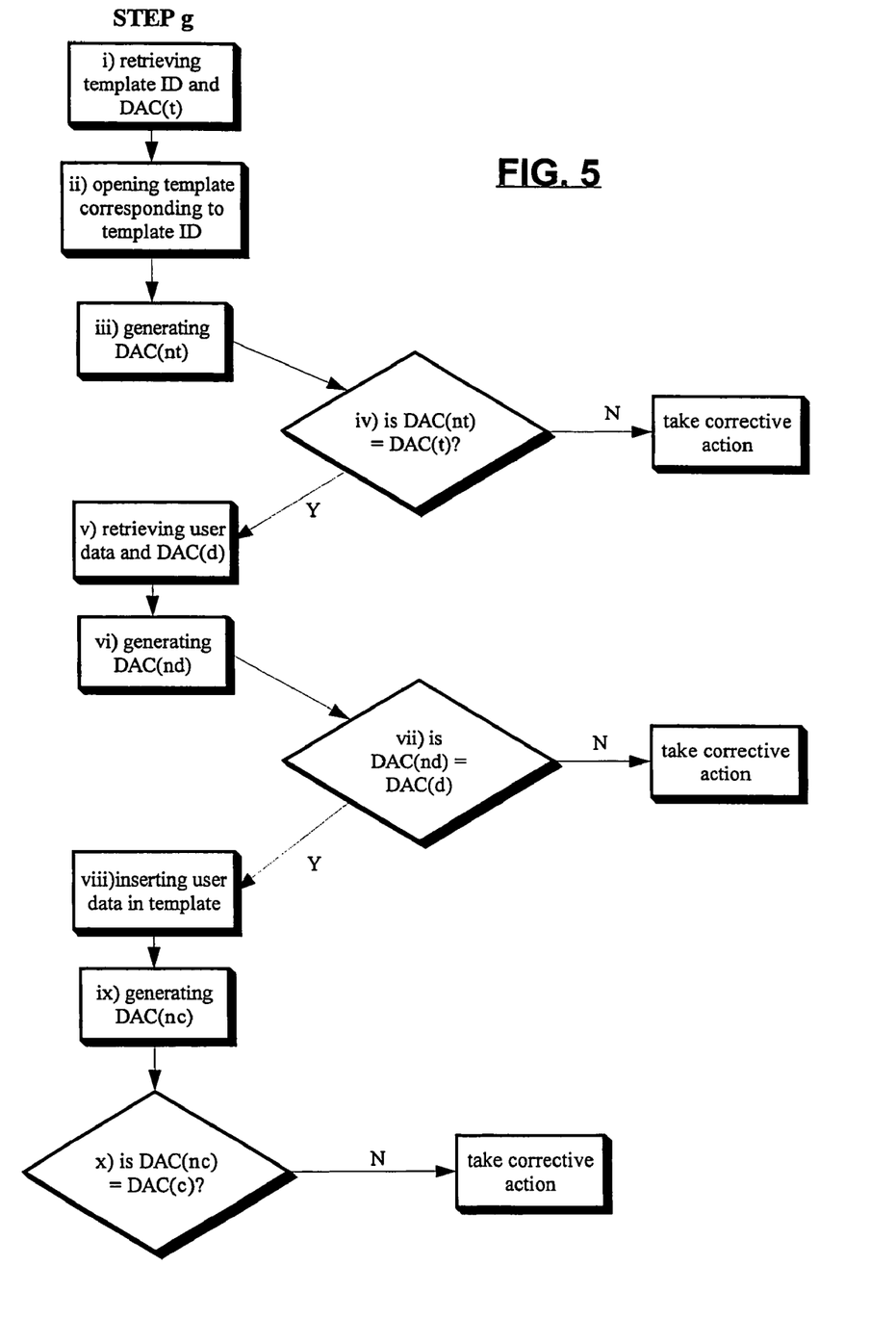
FIG. 5 is a flow chart detailing step g of the method of FIG. 4.
Figure 6:
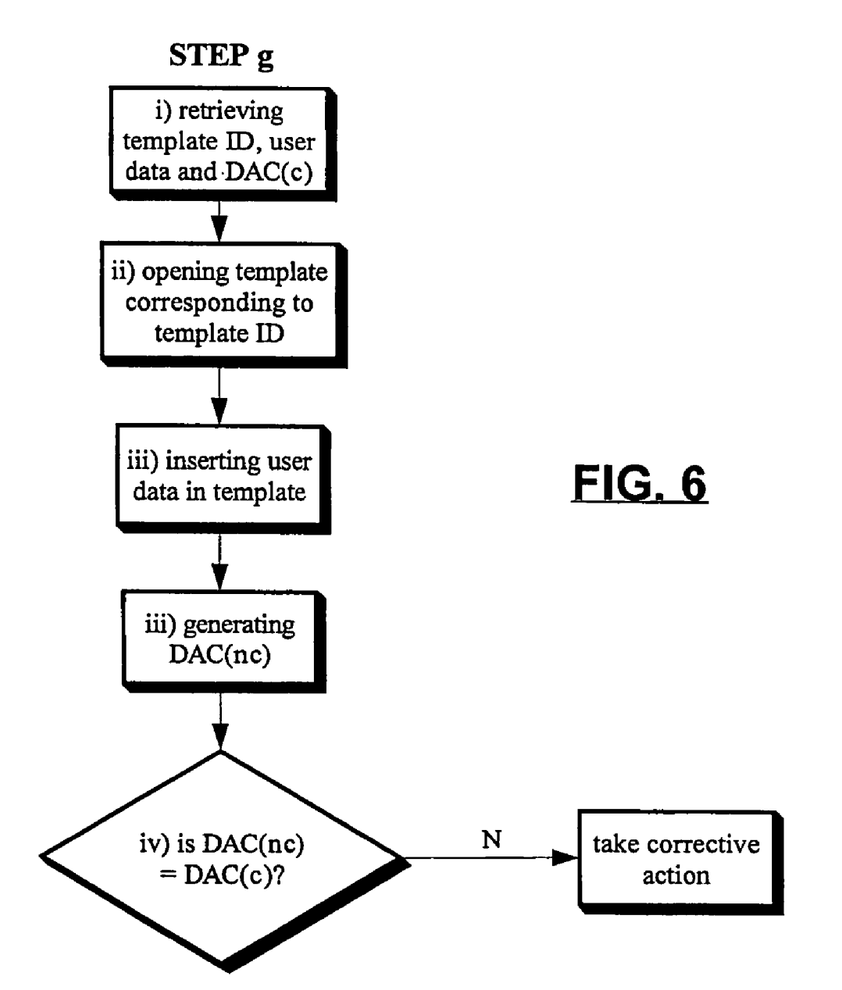
FIG. 6 is a flow chart detailing another variant for step g of the method of FIG. 4.

Referring to FIGS. 4, 5 and 6, there is shown yet another embodiment of the invention. In this particular embodiment, a step is added between steps b) and c) of FIG. 1 where a DAC(c) is generated based on the template with the user data therein, before the user data is extracted from the template. This DAC(c) is stored in the ADP with the other relevant information. In this manner, when reconstructing the complete document, additional substeps of generating a DAC(nc) on the complete document once the user data is inserted in the template and comparing this DAC(nc) with DAC(c) may be performed, as shown in FIG. 5. Alternatively, only the DACs of the complete documents may be compared, completely bypassing the verifications of the separate template and user data, as illustrated in FIG. 6.

Figure 7:
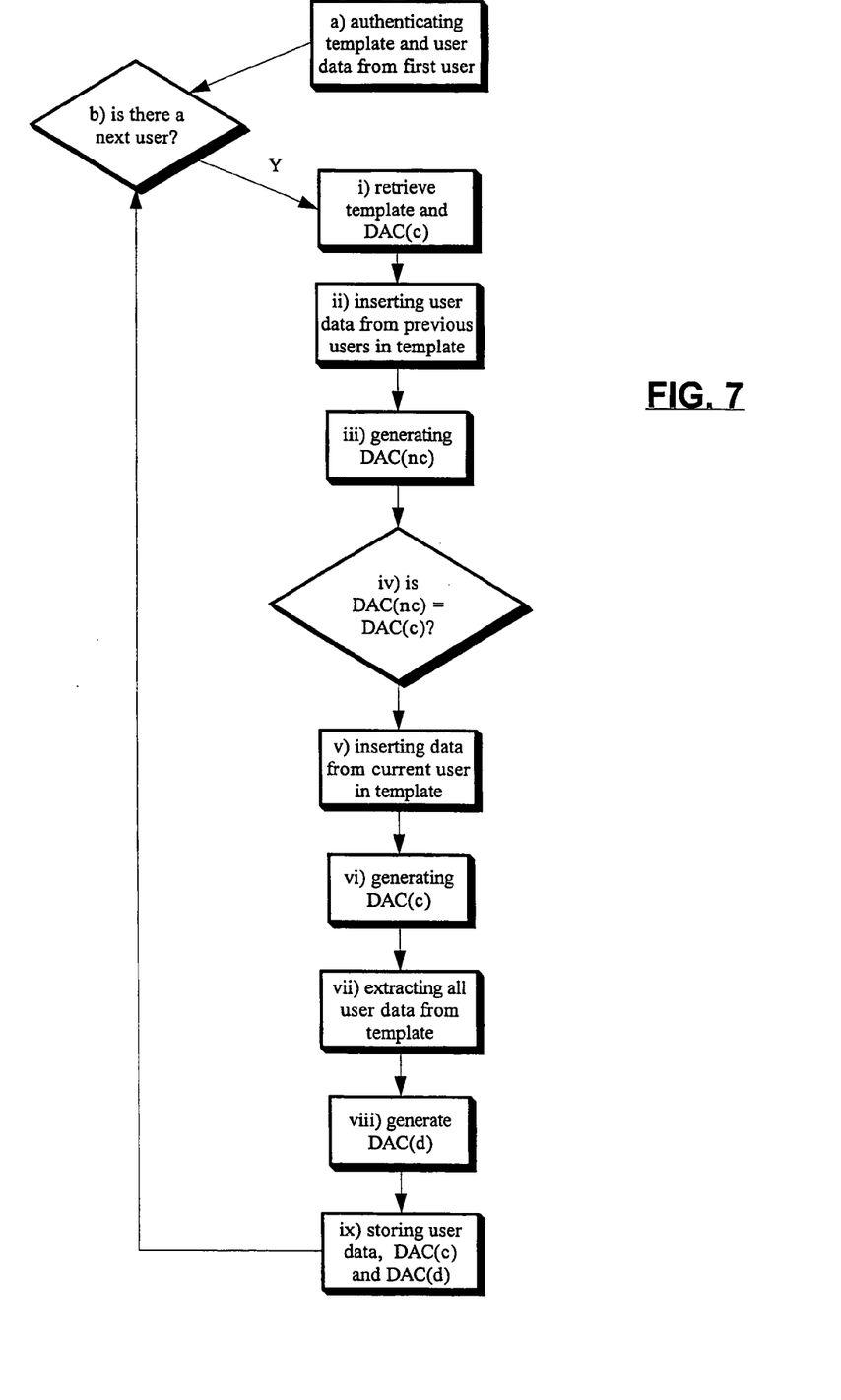
FIG. 7 is a flow chart representing the main steps of a method for the separate authentication of a template and of user data inserted therein in accordance with yet another embodiment of the invention.

Referring to FIG. 7, there is shown another embodiment of the invention where multiple users insert user data sequentially in a single template. The method includes the steps of:

a) authenticating a template and user data from a first user according to the method of FIG. 4. In this manner, an ADP is created containing the template ID, DAC(t), the user data, DAC(d) and DAC(c).

b) for each subsequent user of the multiple users, the following substeps are performed:
  i) retrieving the template and DAC(c) from the ADP;
  ii) inserting user data from previous users in the template. The document thereby generated corresponds to the complete document of the previous iteration;
  iii) generating for the template with the user data from previous users therein a new complete document Document Authentication Code (DAC(nc));
  iv) comparing DAC(nc) with DAC(c), and proceeding only if DAC(nc) is equal to DAC(c);
  v) inserting data from the current user in the template;
  vi) generating a DAC(c), based on the template with the user data from the previous users and current user therein;
  vii) extracting the user data from the previous users and current user from the template;
  viii) generating a DAC(d), based on the user data extracted in step vii); and
  ix) storing the user data, DAC(c) and DAC(d) in ADP. DAC(c) and DAC(d) thereby replace the previously stored values of these variables.

An additional step of reconstructing the complete document, which in this case corresponds to the document generated in the last iteration of step b), may also be performed, either in the manner illustrated in FIG. 5 or FIG. 6.

Of course, numerous changes could be made to the preferred embodiment disclosed hereinabove without departing from the scope of the invention as defined in the appended claims.

What is claimed is:

1. A method for the separate authentication of a document template and of user data inserted therein, comprising the steps of:
   a) providing the document template, said document template being adapted to receive said user data therein, said document template having a corresponding template ID and template Document Authentication Code based on said template, hereinafter referred to as DAC (t), linked thereto, said DAC(t) providing for the authentication of the document template by itself;
   b) inserting the user data in the document template;
   c) extracting the user data from the document template;
   d) generating a user data Document Authentication Code, hereinafter referred to as DAC(d), based on the user data, said DAC(d) providing for the authentication of the user data separately from the document template; and
   e) storing the template ID, the DAC(t), the user data and the DAC(d) in an Approval Data Packet, hereinafter referred to as ADP.

2. The method according to claim 1, wherein step a) comprises the substeps of:
   i) generating the document template;
   ii) creating the template ID;
   iii) creating the DAC(t); and
   iv) storing the template ID and the DAC(t) in a location linked to the document template.

3. The method according to claim 2, wherein substep a)iii) comprises generating the DAC(t) from a one-way hash function.

4. The method according to claim 2, wherein, in substep a) iv), the location linked to the document template is inside said template.

5. The method according to claim 2, wherein, in substep a) iv), the location linked to the document template is a linked storage system.

6. The method according to claim 1, wherein step e) further comprises encrypting the ADP.

7. The method according to claim 1, further comprising an additional step f) of reconstructing an authenticated complete document, said complete document including the document template and the user data.

8. The method according to claim 7, wherein step f) comprises the substeps of:
   i) retrieving the template ID and the DAC(t) from the ADP;
   ii) opening the document template corresponding to said template ID;
   iii) generating for said template a new template Document Authentication Code, hereinafter referred to as DAC(nt);
   iv) comparing the DAC(nt) with the DAC(t), and proceeding only if the DAC(nt) is equal to the DAC(t);
   v) retrieving the user data and the DAC(d) from the ADP;
   vi) generating for said user data a new user data Document Authentication Code, hereinafter referred to as DAC(nd);
   vii) comparing the DAC(nd) with the DAC(d), and proceeding only if the DAC(nd) is equal to the DAC(d); and
   viii) inserting the user data in the document template.

9. A method for the separate authentication of a document template having entry fields and user data inserted into said fields, comprising the steps of:
   a) selecting a template ID and a corresponding template Document Authentication Code based on said document template, hereinafter referred to as DAC(t), linked to the document template, said DAC(t) providing for the authentication of the document template by itself;
   b) entering the user data;
   c) linking the user data to the fields of the document template;
   d) generating a user data Document Authentication Code, hereinafter referred to as DAC(d), based on the user data, said DAC(d) providing for the authentication of the user data separately from said document template; and
   e) storing the template ID, the DAC(t), the user data and the DAC(d) in an Approval Data Packet, hereinafter referred to as ADP.

10. The method according to claim 9, wherein step b) further comprises prompting the user for the user data.

11. The method according to claim 9, wherein step e) further comprises encrypting the ADP.

12. The method according to claim 9, further comprising an additional step f) of reconstructing an authenticated complete document, said complete document including the document template and the user data.

13. The method according to claim 12, wherein step f) comprises the substeps of:
   i) retrieving the template ID and the DAC(t) from the ADP;
   ii) opening the document template corresponding to said template ID;
   iii) generating for said document template a new template Document Authentication Code, hereinafter referred to as DAC(nt);
   iv) comparing the DAC(nt) with the DAC(t), and proceeding only if the DAC(nt) is equal to the DAC(t);
   v) retrieving the user data and the DAC(d) from the ADP;
   vi) generating for said user data a new user data Document Authentication Code, hereinafter referred to as DAC(nd);
   vii) comparing the DAC(nd) with the DAC(d), and proceeding only if the DAC(nd) is equal to the DAC(d); and
   viii) inserting the user data in the document template.

14. A method for the separate authentication of a document template and of user data inserted therein, comprising the steps of:
   a) providing the document template, said document template being adapted to receive said user data therein, said document template having a corresponding template ID and template Document Authentication Code based on said template, hereinafter referred to as DAC(t), linked thereto, said DAC(t) providing for the authentication of the document template by itself;
   b) inserting the user data in the document template;
   c) generating a complete document Document Authentication Code, hereinafter referred to as DAC(c), based on the document template with the user data therein, said DAC(c) providing for the authentication of said template with the user data inserted therein;
   d) extracting the user data from the document template;
   e) generating a user data Document Authentication Code, hereinafter referred to as DAC(d), based on the user data, said DAC(d) providing for the authentication of the user data separately from said document template; and
   f) storing the template ID, the DAC(t), the user data, the DAC(c) and the DAC(d) in an Approval Data Packet, hereinafter referred to as ADP.

15. The method according to claim 14, wherein step a) comprises the substeps of:
   i) generating the document template;
   ii) creating the template ID;
   iii) creating the DAC(t); and
   iv) storing the template ID and the DAC(t) in a location linked to the template.

16. The method according to claim 15, wherein substep a)iii) comprises generating the DAC(t) from a one-way hash function.

17. The method according to claim 15, wherein, in substep a) iv), the location linked to the document template is inside said template.

18. The method according to claim 15, wherein, in substep a) iv), the location linked to the document template is a linked storage system.

19. The method according to claim 14, wherein step f) further comprises encrypting the ADP.

20. The method according to claim 14, further comprising an additional step g) of reconstructing an authenticated complete document, said complete document including the document template and the user data.

21. The method according to claim 20, wherein step g) comprises the substeps of:
   i) retrieving the template ID, the DAC(t) and the DAC(c) from the ADP;
   ii) opening the document template corresponding to said template ID;
   iii) generating for said document template a new template Document Authentication Code, hereinafter referred to as DAC(nt);
   iv) comparing the DAC(nt) with the DAC(t), and proceeding only if the DAC(nt) is equal to the DAC(t);
   v) retrieving the user data and the DAC(d) from the ADP;
   vi) generating for said user data a new user data Document Authentication Code, hereinafter referred to as DAC(nd);
   vii) comparing the DAC(nd) with the DAC(d), and proceeding only if the DAC(nd) is equal to the DAC(d);
   viii) inserting the user data in the document template;

ix) generating for the document template with the user data therein a new complete document Document Authentication Code, hereinafter referred to as DAC (nc); and x) comparing the DAC(nc) with the DAC(c), and proceeding only if the DAC(nc) is equal to the DAC(c).

22. The method according to claim 20, wherein step g) comprises the substeps of:
   i) retrieving the template ID, the user data and the DAC(c) from the ADP;
   ii) opening the document template corresponding to said template ID;
   iii) inserting the user data in the template;
   iv) generating for the document template with the user data therein a new complete document Document Authentication Code, hereinafter referred to as DAC (nc); and
   v) comparing the DAC(nc) with the DAC(c), and proceeding only if the DAC(nc) is equal to the DAC(c).

23. A method for the separate authentication of a document template and of user data inserted therein by multiple users, comprising the steps of:
   a) authenticating a document template and user data from a first user according to the method of claim 14; and
   b) for each subsequent user of the multiple users, performing the substeps of:
      i) retrieving the document template and the DAC(c);
      ii) inserting user data from previous users in the document template;
      iii) generating for the document template with the user data from previous users therein a new complete document Document Authentication Code, hereinafter referred to as DAC(nc);
      iv) comparing the DAC(nc) with the DAC(c), and proceeding only if the DAC(nc) is equal to the DAC(c);
      v) inserting data from the current user in the document template;
      vi) generating a DAC(c), based on the document template with the user data from the previous users and current user therein;
      vii) extracting the user data from the previous users and current user from the document template;
      viii) generating a DAC(d), based on the user data extracted in step vii); and
      ix) storing the user data, the DAC(c) and the DAC(d) in the ADP.

24. The method according to claim 23, further comprising an additional step c) of reconstructing an authenticated complete document, said complete document including the document template and the user data from all of the multiple users.

25. The method according to claim 24, wherein step c) comprises the substeps of:
   i) retrieving the template ID, the DAC(t) and the DAC(c) from the ADP;
   ii) opening the document template corresponding to said template ID;
   iii) generating for said document template a new template Document Authentication Code, hereinafter referred to as DAC(nt);
   iv) comparing the DAC(nt) with the DAC(t), and proceeding only if the DAC(nt) is equal to the DAC(t);
   v) retrieving the user data and the DAC(d) from the ADP;
   vi) generating for said user data a new user data Document Authentication Code, hereinafter referred to as DAC(nd);
   vii) comparing the DAC(nd) with the DAC(d), and proceeding only if the DAC(nd) is equal to the DAC(d);
   viii) inserting the user data in the document template;
   ix) generating for the template with the user data therein a new complete document Document Authentication Code, hereinafter referred to as DAC(nc); and
   x) comparing the DAC(nc) with the DAC(c), and proceeding only if the DAC(nc) is equal to the DAC(c).

* * * * *